(12) United States Patent  (10) Patent No.: US 7,173,560 B2
Li et al.  (45) Date of Patent: Feb. 6, 2007

(54) LAND MINE DETECTOR

(75) Inventors: Jian Li, Gainesville, FL (US); Yijun Sun, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 106 days.

(21) Appl. No.: 10/929,269

(22) Filed: Aug. 30, 2004

(65) Prior Publication Data

US 2005/0128125 A1  Jun. 16, 2005

Related U.S. Application Data

(60) Provisional application No. 60/498,431, filed on Aug. 28, 2003.

(51) Int. Cl.
*G01V 3/12* (2006.01)
(52) U.S. Cl. .......................... 342/22; 342/27; 342/195; 324/326
(58) Field of Classification Search ................... 342/22
See application file for complete search history.

(56) References Cited

U.S. PATENT DOCUMENTS

| | | | | |
|---|---|---|---|---|
| 5,248,975 A * | 9/1993 | Schutz | | 342/21 |
| 5,481,269 A * | 1/1996 | Imhoff et al. | | 342/90 |
| 5,504,487 A * | 4/1996 | Tucker | | 342/90 |
| 5,592,170 A * | 1/1997 | Price et al. | | 342/22 |
| 5,867,118 A * | 2/1999 | McCoy et al. | | 342/90 |
| 6,222,481 B1 * | 4/2001 | Abrahamson et al. | | 342/90 |
| 6,473,025 B2 * | 10/2002 | Stolarczyk et al. | | 342/22 |
| 6,590,519 B2 * | 7/2003 | Miceli et al. | | 342/22 |
| 2002/0122000 A1 * | 9/2002 | Bradley et al. | | 342/22 |
| 2003/0090406 A1 * | 5/2003 | Longstaff et al. | | 342/22 |
| 2003/0193429 A1 * | 10/2003 | Campana et al. | | 342/22 |
| 2004/0096107 A1 * | 5/2004 | Ii et al. | | 382/224 |
| 2005/0100209 A1 * | 5/2005 | Lewis et al. | | 382/159 |

OTHER PUBLICATIONS

Clark et al., "Multispectral Image Feature Selection for Land Mine Detection". IEEE Transactions on Geoscience and Remote Sensing, vol. 38, No. 1. pp. 304-311. Jan. 2000.*

Giridhar, J. and Prabhu, K.M.M, "Doppler resolution analysis of radar returns using Choi-Williams distribution". Proc. of the 13th Intl. Conf. on DSP, Santorini, Greece, pp. 781-784. Jul. 2-4, 1997.*

(Continued)

*Primary Examiner*—Thomas H. Tarcza
*Assistant Examiner*—Matthew M. Barker
(74) *Attorney, Agent, or Firm*—Akerman Senterfitt

(57) ABSTRACT

A forwarding looking ground penetrating mine detection apparatus includes a radiation source for irradiating a sample of ground suspected of containing at least one mine with a plurality of frequency swept ground penetrating radar signals. A detector receives target signals backscattered from the ground responsive to the radar signal. The detector includes a time-frequency analyzer which transforms the target signals into a time-frequency image representation (TFR). In a preferred embodiment, the detector can include a wavelet packet transformer (WPT) for extracting time-frequency localized information from the TFR in the form of feature set constructed from a wavelet table. The apparatus can also include a data dimensionality reducer for selecting features to form a feature subset from the feature set, preferably based on reference to a training data set. A multilayer neural network classifier can be based on the feature subset, and be adaptable to the surrounding environment through learning.

23 Claims, 12 Drawing Sheets

(a)

OTHER PUBLICATIONS

Swets, Daniel L. and Weng, John. "Using Discriminant Eigenfeatures for Image Retrieval". IEEE Transactions on Pattern Analysis and Machine Intelligence, vol. 18, No. 8. pp. 831-836. Aug. 1996.*

Iizuka, Keigo et al. "Detection of Nonmetallic Buried Objects by a Step Frequency Radar". Proceedings of the IEEE, Feb. 1983. vol. 21, Issue 2. pp. 276-279.*

Sun, et al., "Time-Frequency Analysis for Plastic Landmine Detection via Forward Looking Ground Penetrating Radar," IEE Proc. Radar, Sonar & Navigation, vol. 150, No. 4, Aug. 2003.

Sullivan, et al. "Ultrawide-Band Synthetic Aperture Radar for Detection of Unexploded Ordnance: Modeling & Measurements", IEEE Tran. on Ant. & Prop., vol. 48, No. 9, Sep. 2000.

Gu, et al., "Adaptive Ground Bounce Removal", Proc. SPIE, vol. 4742, pp. 719-727, Aug. 2002.

Haykin "Modular Learning Strategy for Signal Detection in a Nonstationary Environment", IEEE 1997.

Hlawatsch, et al., "Linear & Quadratic Time-Frequency Signal Representations", IEEE SP Magazine, pp. 21-67, Apr. 1992.

Ling, et al., "Time-Frequency Analysis of Backscattered Data From a Coated Stripwith a Gap," IEEE Trans. on Ant. & Prop., vol. 41, No. 8, pp. 1147-1150, Aug. 1993.

Gillespie, et al. "Optimizing Time-Frequency Kernels for Classification," IEEE Trans. on Signal Proc., vol. 49, No. 4, pp. 485-495, Mar. 2001.

Martinez, et al., "PCA versus LDA", IEEE Tran. on Pattern Analysis & Machine Intelligence, vol. 23, No. 2, pp. 228-233, 2001.

Swets, et al., "Using Discriminant Eigenfeatures for Image Retrieval," IEEE Tran. on Pattern Analysis & Machine Intelligence, vol. 18, Aug. 1996.

* cited by examiner

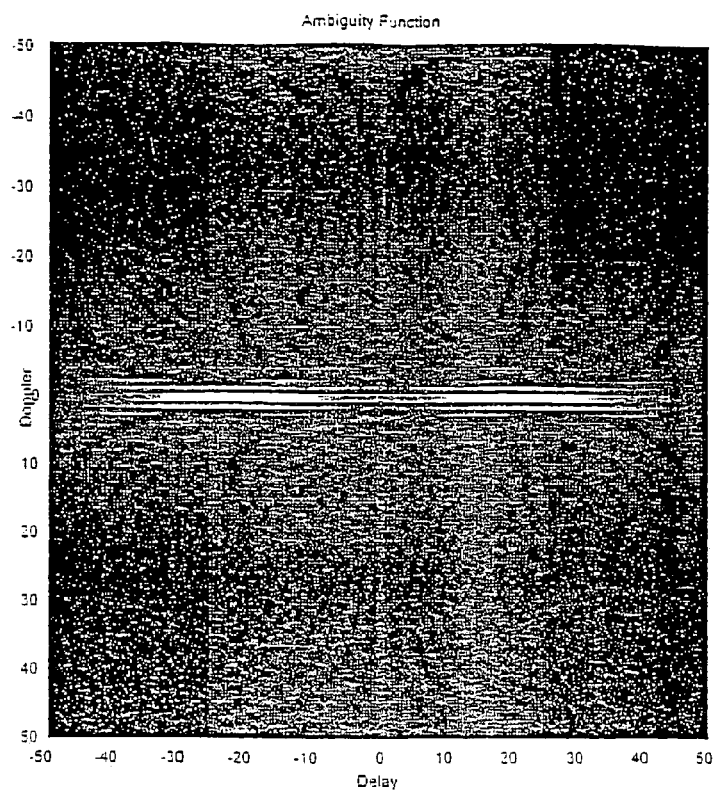
(a)
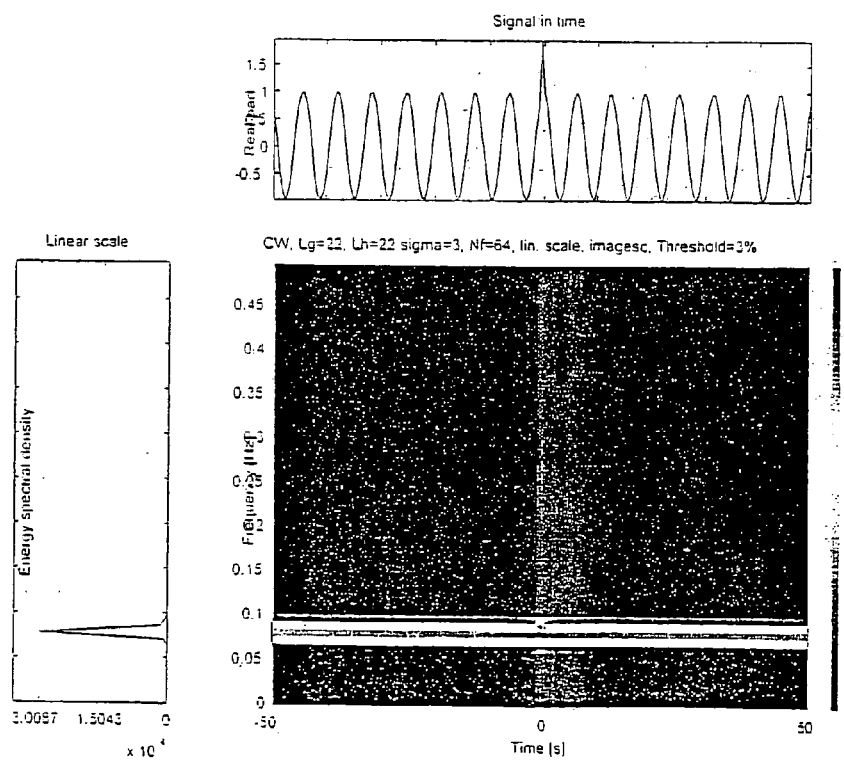
(b)
FIG. 2

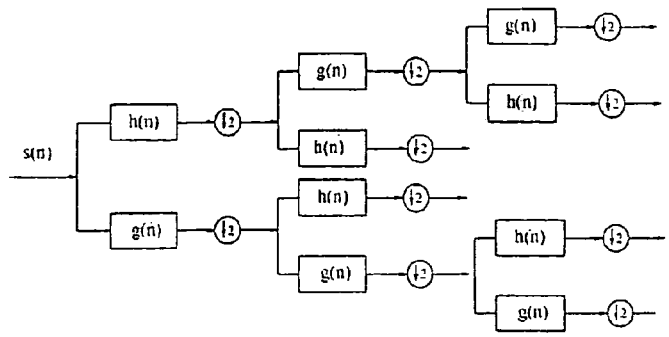
(a)
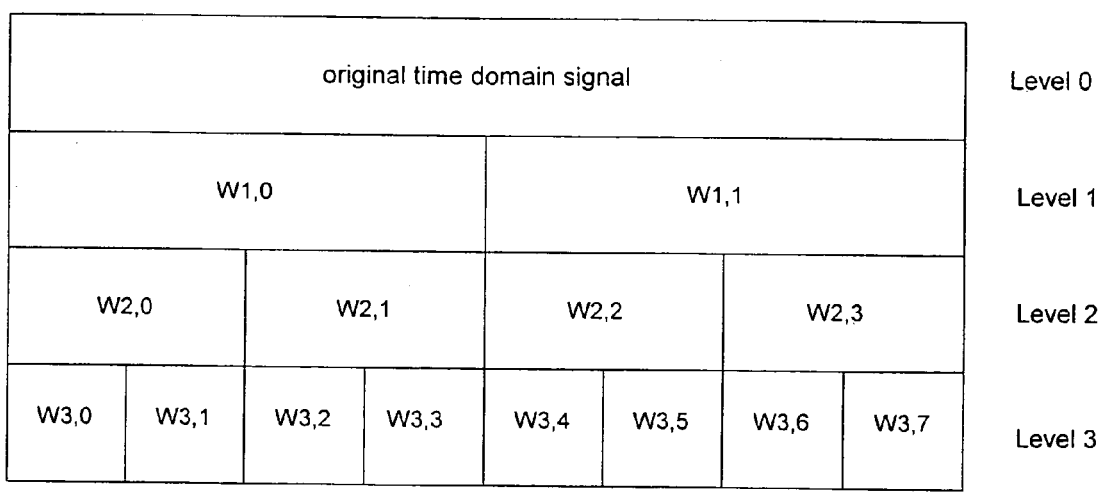
(b)
FIG. 4

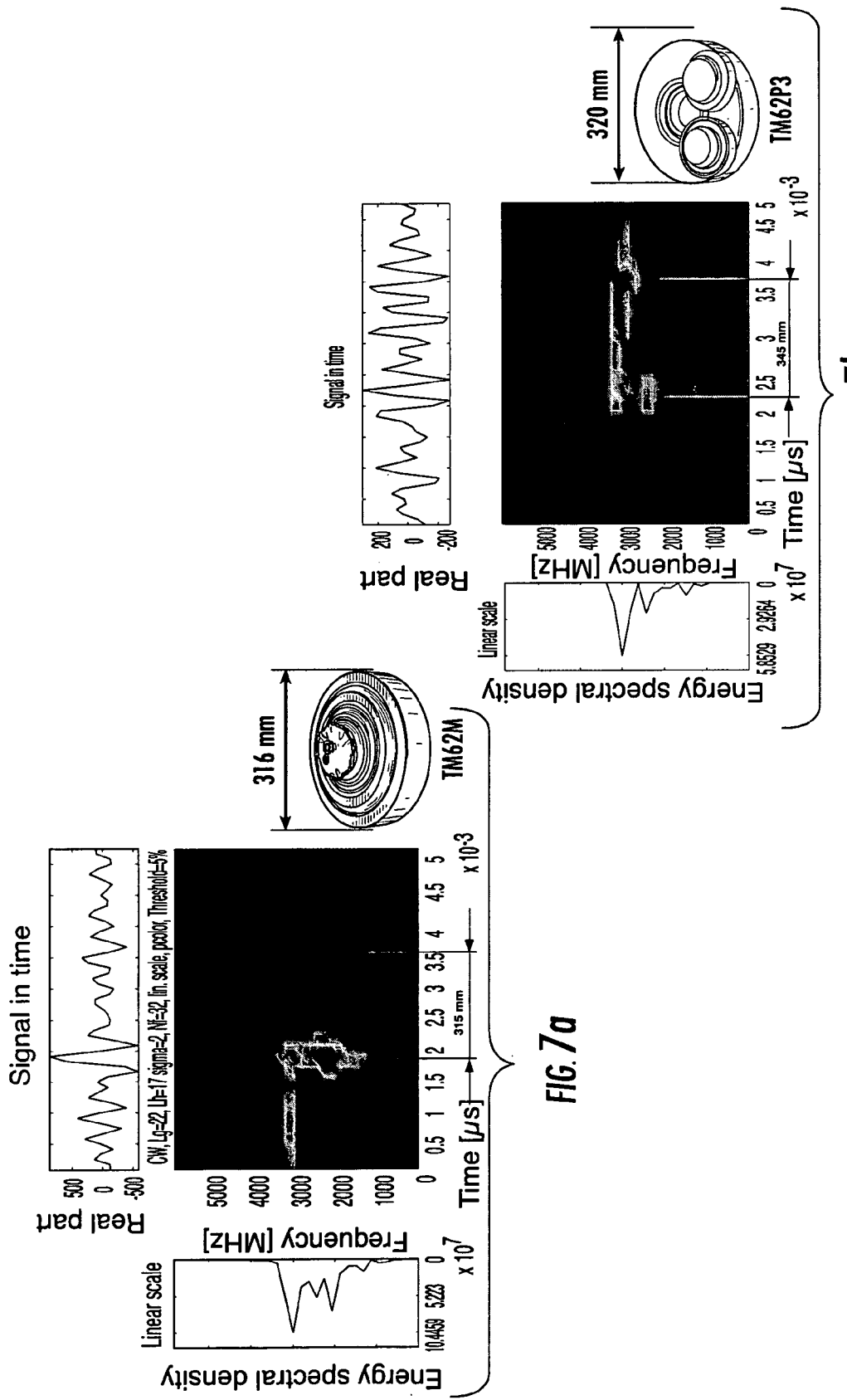

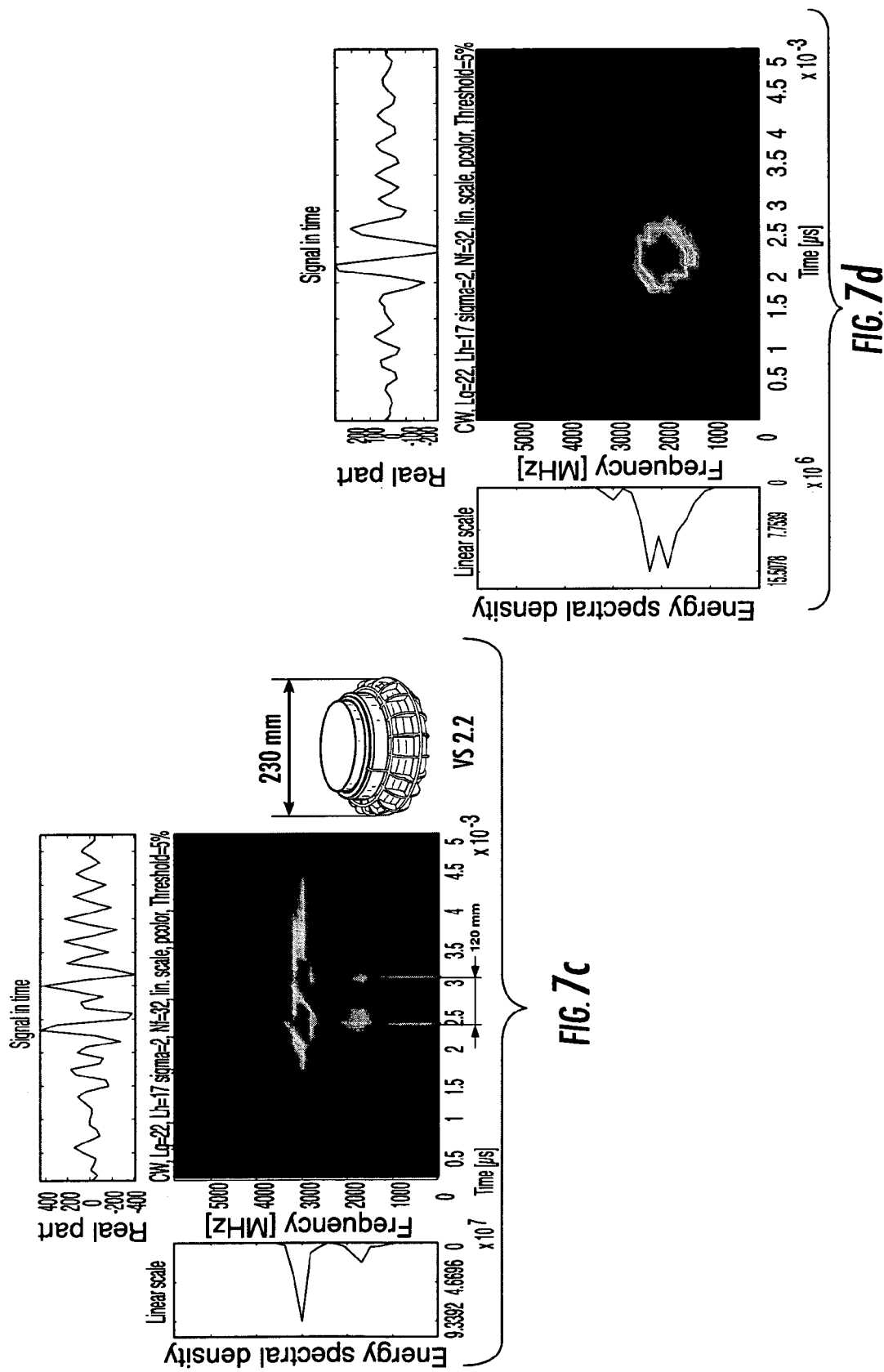

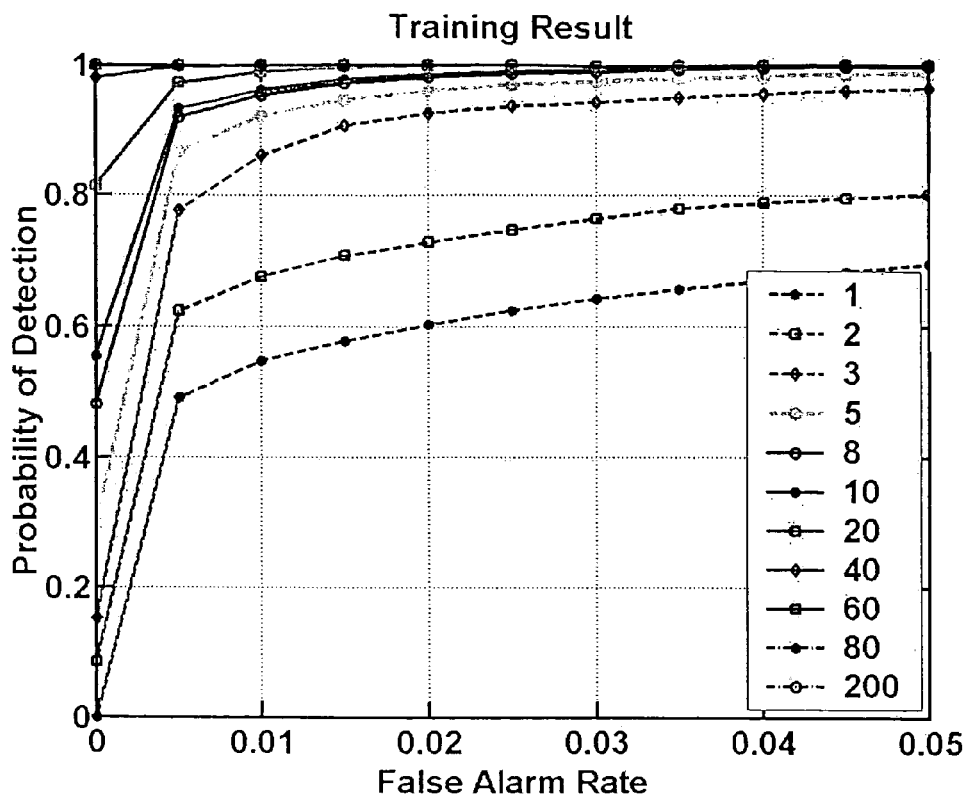
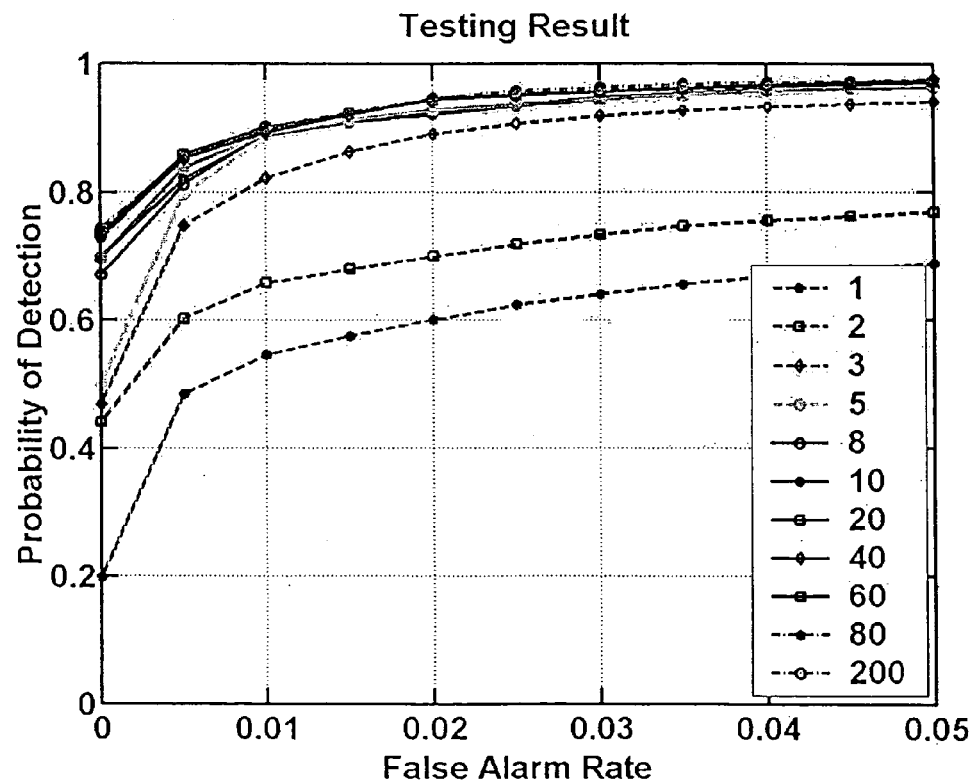
FIG. 9

LAND MINE DETECTOR

CROSS-REFERENCE TO RELATED APPLICATIONS

This application claims the benefit of U.S. Provisional Application No. 60/498,431 entitled "Signal Processor for Land Mine Detection" filed on Aug. 28, 2003, the entirety of which is incorporated herein by reference.

STATEMENT OF FEDERALLY SPONSORED RESEARCH

The United States Government has rights in this invention pursuant to United States Army research grant DAAB15-00-C-1024 to the University of Florida.

STATEMENT OF THE TECHNICAL FIELD

The present invention relates to advanced signal processing techniques and more particularly, to a mine detection apparatus including a time-frequency analyzer for detecting buried land mines.

BACKGROUND OF THE INVENTION

The death and destruction associated with armed conflict often does not end with the conclusion of a peace treaty between warring parties. Rather, the remnant of armed conflict—land mines—remains a destructive threat long after hostilities have ended. In this regard, at present land mines are known to have caused substantial humanitarian and economic harm in regions throughout the globe, particularly in those regions which no longer host armed conflict. International experts estimate that up to one-hundred and ten million land mines remain to be cleared and that more than five-hundred civilians are killed or maimed every week by land mines. Many of these victims are children.

Despite the enormity of the problem of land mine clearance, such is known to be an extraordinarily challenging task. At the current rate at which land mines are cleared from their deadly, stealth positions, it has been estimated that more than one thousand years will be required to remove all of the land mines which have already been positioned, not accounting for those land mines which are continually placed elsewhere in the world. Nevertheless, for decades and at present, the most common method of detecting land mines remains the garden-variety metal detector. However, the usefulness of the metal detector falls off sharply in the face of a land mine having little or no metallic content, for instance a buried plastic land mine.

Ground penetrating radar (GPR) has been developed precisely for the purpose of detecting buried targets not based upon the metallic contents thereof, but based upon differences in the dielectric permittivity of the buried targets as compared to the surrounding environs. Accordingly, GPR has been recognized as a viable alternative to metal detection in the quest for a viable plastic land mine detector. Currently, two types of GPR systems have been investigated for their respective effectiveness in the detection of buried plastic land mines. One type of GPR system, the downward-looking GPR system, has shown promise in its ability to detect land mines, albeit downward-looking GPR systems suffer from some inherent limitations. The other type of GPR system, the forward looking GPR system, can be more complex than the downward-looking GPR system, albeit the inherent limitations of downward-looking GPR systems are not present.

In the downward-looking GPR system, antennae can be placed near the surface of the earth from whence radar signals can be transmitted downwardly and reflected back to the antennae. Consequently, strong radar signals can be reflected directly from the ground surface back into the antennae. Removing these strongly reflected signals, referred to as "ground bounce", can be a challenging problem although conventional downward-looking GPR systems have been effective in removing substantial portions of the ground bounce signal from the radar imagery. Still, the utility of the downward-looking GPR system can be defeated through the time consuming nature of the operation of the downward-looking GPR system when interrogating a large area. Additionally, the short standoff distance between a system and mines can be problematic and dangerous when clearing a mine field. Accordingly, a forward looking GPR system can be desirable in many circumstances.

In a forward-looking GPR system, the antennae can be mounted on the front of a vehicle configured for deployment in a mine field. The forward-looking GPR system can capture radar signals at equally spaced positions as the vehicle moves forward in the mine field. Synthetic aperture radar (SAR) images can then be formed from the received signals. In this way, ground bounce can be reduced and a large standoff distance can be established between the vehicle and the mines in the mine field. Still, several problems remain in the use of a forward-looking GPR system which can defeat its effectiveness as a land mine clearance tool.

For instance, as the antennae of the forward-looking GPR system transmit energy at an acute angle to the ground and any land mines buried there beneath, most of the radar transmitted energies are reflected off the targets away from the antennae and only a very small fraction of the transmitted energy can be received by the antennae. Additionally, deeper buried mines can produce even weaker reflected signals. To compound matters, the nearly identical dielectric coefficients of plastic land mines and the surrounding soil can produce weak recognition as plastic mines cannot be seen convincingly in the spatial domain in the presence of clutter. Hence, detecting buried plastic mines can be extraordinarily challenging for a forward-looking GPR system.

In the past few years, several methods have been proposed for the forward-looking GPR systems and other similar detection systems. In particular, some signal processing techniques have been applied to radar signals produced from forward-looking GPR systems. In this regard, the effectiveness of several statistical signal processing techniques have been investigated for different mine types, burial depths and mine placements, including polarimetric whitening filter (PWF) and the generalized likelihood ratio test (GLRT). While the foregoing methods are reported to have been effective for detecting metal and surface mines with a high confidence, the same cannot be said of buried plastic land mines.

The failure of modern signal processing techniques to prove effective in detecting plastic land mines can be explained by reference to the failure of such techniques to fully utilize rich target signature information. More specifically, the conventional assumption that background signals can be modeled as Gaussian, log normal, or other such typical distribution can be inappropriate in the context of plastic land mine detection. In effect, the resultant constant false alarm rate (CFAR) detectors can be considered merely as energy based detectors.

Conventionally, the land mine detection problem had been formulated as to detect a target signal corrupted by several interference signals. For the sake of mathematical tractability, interference signals usually can be modeled as an additive white Gaussian noise (AWGN). In this respect, a matched filter has proven to be optimal under the AWGN assumption. Still, in practical applications, the Gaussian assumption of the interference signals has proven merely to be approximate rather than exact. In the buried plastic land mine detection context, the interference term actually has been shown to include two distinct portions: a measurement noise which may be properly modeled as AWGN; and a signal reflected from the ground or clutter which is non-stationary in nature and substantially non-Gaussian due to the time-varying nature of the environment.

The design of a land mine detector can be difficult when the statistics of the interference signals are not known precisely. Specifically, when the interference signal is non-stationary in nature, the detector must incorporate a time-varying structure, making the detector design even more difficult than ordinary. Moreover, when designing a detector, experts recommend the use of a priori information for the target signals where possible, such as the signal waveform or signature. The a priori information typically can be determined from a set of given training signals. To that end, one may estimate the signal waveform by simply averaging the training signals. In this case, the estimated target signal will converge to the true signal asymptotically.

Nevertheless, under the condition that the number of the training signals is limited and there exists a strong nonstationary interference, the averaging method may not be the best choice. To make matters worse, there may exist time-shift and frequency-shift issues that must be taken into account. Indeed the target signal can be so weak and embedded within a noisy background such that one cannot estimate its starting time correctly from the training signals. Moreover, due to the complicated operating environment, the frequency-shift may occur for the training signals. Accordingly, conventional techniques for processing signals from forward-looking GPR systems have not been effective for detecting most mines, particularly buried plastic land mines.

SUMMARY OF THE INVENTION

A forward-looking ground penetrating mine detection apparatus includes a radiation source for irradiating a sample of ground suspected of containing at least one mine with a plurality of frequency swept ground penetrating radar signals. A detector receives target signals backscattered from the ground responsive to the radar signal. The detector includes a time-frequency analyzer. The time-frequency analyzer transforms the target signals into a time-frequency image representation (TFR). Although several linear or bi-linear time-frequency representations can be chosen to generate the TFR, in a preferred embodiment the time-frequency analyzer implements a Choi-Williams Distribution (CWD).

In a preferred embodiment, the detector can include a wavelet packet transformer (WPT) for extracting time-frequency localized information from the TFR in the form of feature set constructed from a wavelet table. The time-frequency localized information can comprise a feature set constructed from a wavelet table provided by the WPT, the feature set having a first, data dimensionality. The apparatus preferably includes a data dimensionality reducer for selecting features to form a feature subset from the feature set, the feature subset having a reduced dimensionality as compared to the first dimensionality. The dimensionality reducer can implement a sequential forward selector (SFS) with a cost function to compile the feature subset. The cost function can comprise a linear discriminant analysis (LDA) cost function and the SFS comprise a sequential floating forward selector.

The data dimensionality reducer can select the feature subset based on reference to a training data set. A multilayer neural network classifier can be based on the feature subset. The neural network is preferably a trained network where the training comprises minimizing a cross entropy function. The neural network can implement a boosting based adaptive feature selector.

A mine detection method includes the steps of receiving a signal backscattered from a ground penetrating swept radar radiated ground sample, generating a time-frequency representation based on the backscattered signal, and analyzing the time-frequency representation to indicate whether a mine is in the ground being interrogated. The method can further comprise the step of wavelet packet transforming to extract time-frequency localized information from the TFR data, the time-frequency localized information comprising a feature set constructed from a wavelet table provided by the wavelet packet transform. The method can include data dimensionality for extracting features from the feature set to provide a reduced dimensionality feature subset, preferably using a reference to a training data set. A multilayer neural network classifier based on said feature subset can be configured. The neural network can be trained to a surrounding environment adjacent to the ground interrogated. The neural network preferably implements a boosting based adaptive feature selector.

BRIEF DESCRIPTION OF THE DRAWINGS

There are shown in the drawing embodiments which are presently preferred, it being understood, however, that the invention is not limited to the precise arrangements and instrumentalities shown, wherein:

FIG. 1(a) shows an illustration of a ground penetrating radar based mine detection system according to an embodiment of the invention, while FIG. 1(b) shows a photograph of a prototype system.

FIG. 2(a) shows the ambiguity function (AF) while FIG. 2(b) shows a Choi-Williams distribution (CWD) derived time-frequency (TF) image representation for a toy example.

FIG. 3(a) is a scanned mine picture, the corresponding radar image chip and the time-frequency representation for an M1 mine buried at the depth of 3 inches; while

FIG. 4(a) shows a wavelet packet transform with h(n) and g(n) being a pair of QMF, while FIG. 4(b) shows the resulting wavelet packet table. Each node is indexed by the corresponding wavelet packet coefficients.

FIG. 7 shows scanned time-frequency representations obtained from surface placed mines and a stake: (a) metal mine (TM62M), (b) plastic mine (TM62P3), (c) plastic mine (VS 2.2), and (d) stake (fiducial), respectively.

FIGS. 9(a) and (b) show training and testing results, respectively, for the ensemble classifier without the feature selection being integrated into each iteration. The numbers in the legend are the iteration numbers. The first iteration corresponds to the classifier without the boosting algorithm AdaBoost.

DETAILED DESCRIPTION OF THE PREFERRED EMBODIMENTS

The present invention is a land mine detector for identifying the presence of buried land mines, including plastic mines, using forward-looking radar signals. Although described for application to buried land mines, the classification methodology described herein can be utilized generally for improved recognition of wide variety of objects, particularly when the objects to be detected are in highly cluttered environments.

A forwarding looking ground penetrating mine detection apparatus includes a radiation source for irradiating a sample of ground suspected of containing at least one mine with a plurality of frequency swept ground penetrating radar signals. A detector receives target signals backscattered from the ground responsive to the radar signal. The detector includes a time-frequency analyzer. The time-frequency analyzer transforms the target signals into a time-frequency image representation (TFR). In a preferred embodiment, the detector can include a wavelet packet transformer (WPT) for extracting time-frequency localized information from the TFR in the form of feature set constructed from a wavelet table. The apparatus can also include a data dimensionality reducer for selecting features to form a feature subset from the feature set, preferably based on reference to a training data set.

A multilayer neural network classifier can be based on the feature subset, and be adaptable to the surrounding environment through learning. Learning can be based on a boosting method which can train an ensemble of classifiers sequentially with the subsequent classifiers focusing on the errors made by the previous ones.

Figure 1:
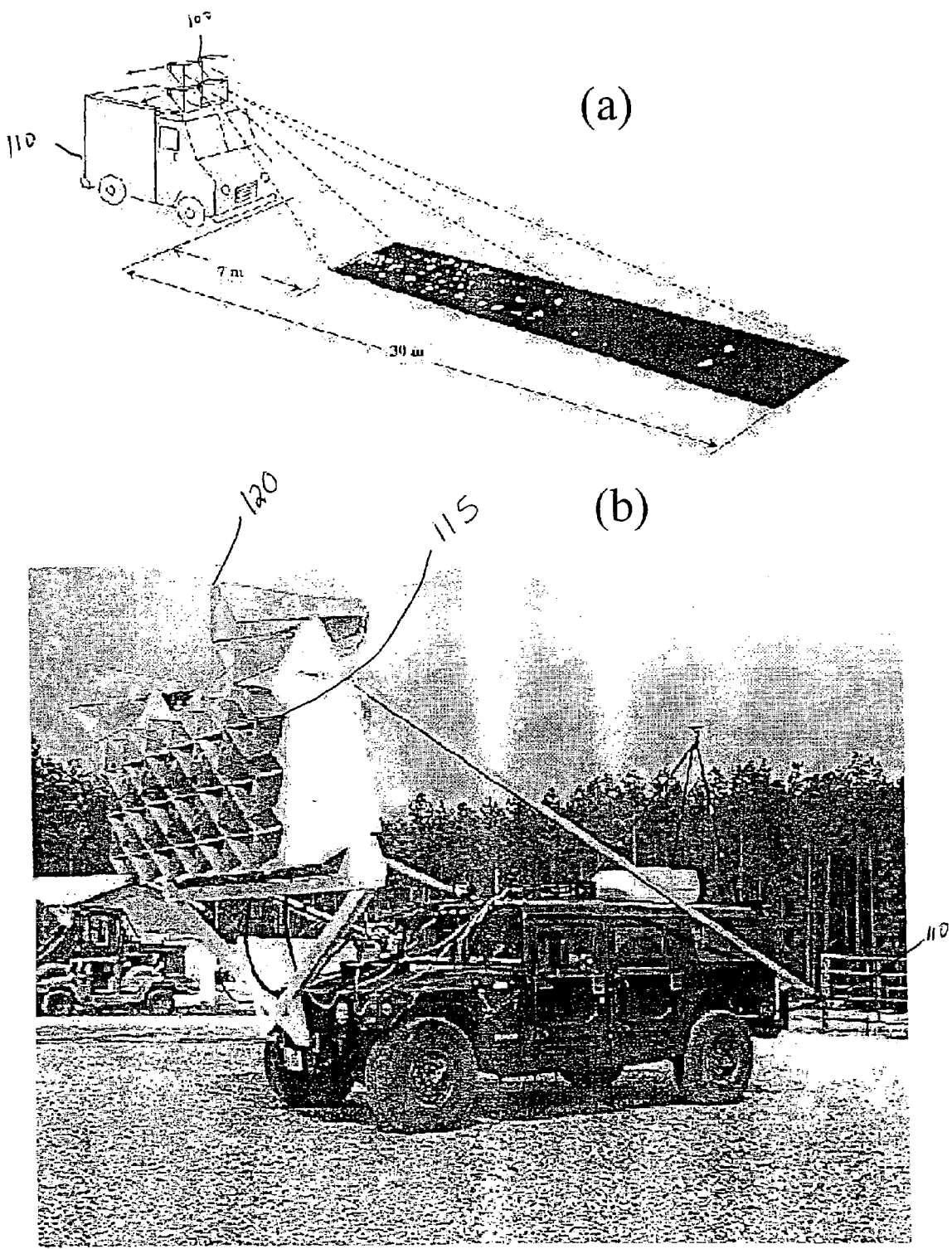

As shown in FIG. 1(a), an exemplary ground penetrating radar (GPR) system according to the invention 100 includes GPR antennas mounted on the front of a vehicle 110 and captures radar signals as the vehicle 110 moves forward. A photograph of an exemplary system is shown in FIG. 1(b). This system 100 consists of 2 transmitters (not shown) and 18 receiver quad-ridged horn antennas 115. The height of the transmitter antennas (two large horns 120) is about 3.3 m above the ground and their geometry center is 3.03 m away from each other. The 18 receiver antennas 115 are horizontally equally spaced with 17 cm center to center and the height of the bottom row is about 2 m above the ground.

For example, the system 100 can be an ultra wideband (UWB) stepped frequency system. In one embodiment, system 100 operates at 1024 discrete frequencies evenly spaced over the frequency range from 442.5 MHz to 3 GHz with a step size of 2.5 MHz starting from the lowest frequency.

The two transmitter antennas 120 work sequentially and all the receiver antennas work simultaneously. Hence there are total of 36 channels of the received signal for each scan or vehicle location. Data can be recorded while the vehicle moves forward and the distance between two adjacent scans is about 2 m. A Global Positioning System (GPS) is preferably used to measure the location of the system for each scan (not shown). With the use of the delay-and-sum imaging algorithm, a high resolution radar image can be formed from the received signals. At each scan location, the image region can be 6 m (cross-range) by 30 m (down-range) with a 7 m standoff distance ahead of the vehicle shown in FIGS. 1(a) and (b). A pixel spacing of 4 cm may be used in both the down-range and cross-range dimensions. In the experiments performed using the invention, images ranging from 10 m to 20 m ahead of the vehicle were generally only used since system 100 was optimized for this range. With the use of the receiver antenna array 115, a high resolution radar image can be formed from the received backscattered signals. Although not shown, system 100 includes a detector and associated signal processors which are used to detect the presence of the landmines in the radar images obtained.

The signal processors include a time-frequency analyzer which is coupled to the detector. The time-frequency analyzer transforms the received target signal into a time-frequency image representation (TFR). In accordance with the present invention, one of several linear or bi-linear time-frequency representations can be chosen to generate the TFR which facilitates the identification of land mines. It will be recognized by the skilled artisan that the selection of a specific time-frequency representation can be application specific and that some a priori information can be used in furtherance of this purpose. Several distribution functions can be used to create the TFR from the received target signals.

For example, the Fourier transform is one such distribution. The Fourier transform uses sinusoidal functions as the basis functions and dilutes the transient components of a signal along the entire basis. As a result, the Fourier transform is not suitable for the analysis of time-varying signals. However, one of the simplest ways to overcome this drawback of the Fourier transform is the short-time Fourier transform (STFT), which is given as follows:

$$STFT_\epsilon^{(\gamma)}(t,f) = \int s(t')\gamma^*(t'-t)e^{-j2\pi ft'}dt' \quad (1)$$

where s(t) is the signal of interest, γ(t) is an analysis window function and the superscript * denotes the complex conjugate. It is noted that the resulting time-frequency image is significantly influenced by the choice of the window function. More specifically, a short window leads to good time resolution but poor frequency resolution, and vice versa. Therefore, in the case where both high time and frequency resolutions are required, the STFT is generally found to be inadequate.

The STFT computes correlations between the signal and a family of basis functions. Thus the time frequency resolution is governed by the corresponding set of elementary functions. In addition to the correlation based approach, there is another type of time-frequency representation which is motivated by the time-frequency energy density. When the power spectral density (PSD) is computed, one way is to compute the Fourier transform of the auto-correlation function as follows:

$$|S(f)|^2 = \int R(\tau)e^{-j2\pi f\tau}d\tau \quad (2)$$

where the auto-correlation function R(τ) is defined as:

$$R(\tau) = \int s(t+\tau/2)s^*(t-\tau/2)dt = \int R(t,\tau)dt \quad (3)$$

it is noted that R(τ) is actually the average of the instantaneous correlation R(t,τ) defined as above. By averaging, the time information is lost. As a counterpart of the PSD, R(τ) is substituted with R(t,τ) which leads to:

$$WVD(t,f) = \int R(t,\tau) e^{-j2\pi f \tau} d\tau \quad (4)$$

Equation (4) is usually called the Wigner-Ville distribution (WVD). There is clearly no window effect anymore. Compared to the STFT, the WVD offers a better signal representation in the time-frequency domain. In addition to the high resolution, the WVD possesses many desirable properties for signal analysis. However, it is also recognized that the WVD suffers from a so-called cross-term interference problem which prevents the WVD from being used for many practical applications. Since the cross-term is almost always oscillatory, the most straightforward way of removing the cross-term is through 2D lowpass filtering:

$$C(t,f) = \int\int \phi(x,y) WVD(t-x, f-y) dx dy \quad (5)$$

where $\phi(x,y)$ is a 2D lowpass filter. The equation can also be rewritten as:

$$C(t,f) = \int\int \Phi(\nu,\tau) AF(\nu,\tau) e^{j2\pi(t\nu - f\tau)} d\nu d\tau \quad (6)$$

where $\Phi(\nu,\tau)$ is the Fourier transform of $\phi(x,y)$ and AF is the ambiguity function (AF) of the signal s(t) defined as:

$$AF(\nu, \tau) = \int\int WVD(t, f) e^{-j2\pi(t\nu - f\tau)} dt df \quad (7)$$
$$= \int s(t+\tau/2) s^t(t-\tau/2) e^{-j2\pi\nu t} dt$$

The AF plays an important role in the time-frequency analysis. The square magnitude $|AF|^2$ is commonly called ambiguity surface. The ransformation to $|AF|^2$ is a time-shift and frequency-modulation invariant transformation. To see this, suppose $s'(t)=s(t-t_0)e^{(-j2\pi f_0 t)}$ is a time-shift and frequency-modulated version of s(t): Then:

$$|AF_s|^2 = |\int s^t(t+\tau/2) s'^*(t-\tau/2) e^{-j2\pi\nu t} dt|^2 = |AF_e|^2 \quad (8)$$

Returning to Equation (6), it can be seen that the 2D convolution between the lowpass filter and the WVD can also be achieved by the multiplication of, the AF with a kernel function. The equation is commonly named as Cohen's classes, which can greatly facilitate the selection of the desired kernel. Since different kernel functions determine different properties of the resulting time-frequency representation of a given signal, the kernel function selection is an application specific task. In the paragraphs below, detail of the kernel function selection issue based on the particular problem of plastic mine detection will be described.

Before proceeding, a simple toy example which is closely related to plastic mine detection is presented. Suppose a signal s(t) composed of two signal components: one is a sinusoid and the other is an impulse, i.e., $$s(t) = e^{j2\pi ft} + \delta(t) \Delta s_1(t) + s_2(t) \quad (9)$$

The ambiguity function of the signal is then given by:

$$AF_s = \int s(t+\tau/2) s^t(t-\tau/2) e^{-j2\pi\nu t} dt \quad (10)$$
$$= e^{j2\pi ft} \delta(\nu) + \delta(\tau) e^{j\pi\nu\tau} + e^{j\pi(2f+\nu)\tau} + e^{j\pi(2f-\nu)\tau}$$
$$= AF_{s_1} + AF_{s_2} + AF_{s_1 s_2} + AF_{s_2 s_1}$$

where $AF_{s1}$ and $AF_{s2}$ are the auto-ambiguity functions of the signals $s_1(t)$ and $s_2(t)$, respectively, and $AF_{s1s2}$, $AF_{s2s1}$ are the cross-ambiguity functions between the signals $s_1(t)$ and $s_2(t)$. From Equation (10), it can be seen that the auto-ambiguity functions are distributed only along the time-delay and Doppler-shift axes. This observation suggests the use of the Choi-Williams distribution (CWD) since the corresponding kernel function is given by:

$$\Phi(\nu,\tau) = e^{-\alpha(2\pi\nu\tau)^2} \quad (11)$$

Mathematically, the CWD can be expressed as:

$$CWD(t,f) = \int\int\int \Phi(\nu,\tau) s(\mu+\tau/2) s^*(\mu-\tau/2) \exp^{j2\pi\nu(t-\mu)}$$
$$\exp^{-j2\pi f\tau} d\nu d\tau d\mu (1) \quad (12)$$

where s(t) is the signal of interest, $\Phi(\nu,\tau) = \exp^{-\alpha(2\pi\nu\tau)^2}$ is the kernel function to reduce highly oscillatory cross terms and alpha is the parameter to control the spread of the kernel. From the CWD equation above, it can be seen that after the CWD transform, a one-dimensional signal is transformed into a two-dimensional image over the time-frequency plane. In the radar applications, these images have been found to greatly facilitate the understanding and interpretation of the different scattering phenomena of targets.

The kernel function preserves the information along both axes while suppressing the cross-term away from the axes. The parameter α controls the decay spread. It should be noted that since the kernel keeps the cross-term in both axes, there are some horizontal and vertical ripples in the time-frequency domain. The resulting ambiguity function (AF) and the Choi-Williams distribution for this toy example is shown in FIGS. 2(a) and (b), respectively.

It is well-known that for real-valued signals, the WVD suffers from an aliasing problem because the period of the WVD is π instead of 2π. Even for complex-valued signals, the aliasing problem still exists. There are at least two ways to deal with this problem. One way is to use analytic signals instead of original signals. Since analytic signals are derived through the Hilbert transform to discard the negative frequency components, it can be shown that using analytic signals will alter the original WVD, particularly in the low frequency band. The other one is to oversample the original signals to avoid the aliasing, which is what is preferred for use with the present invention.

Figure 3A:
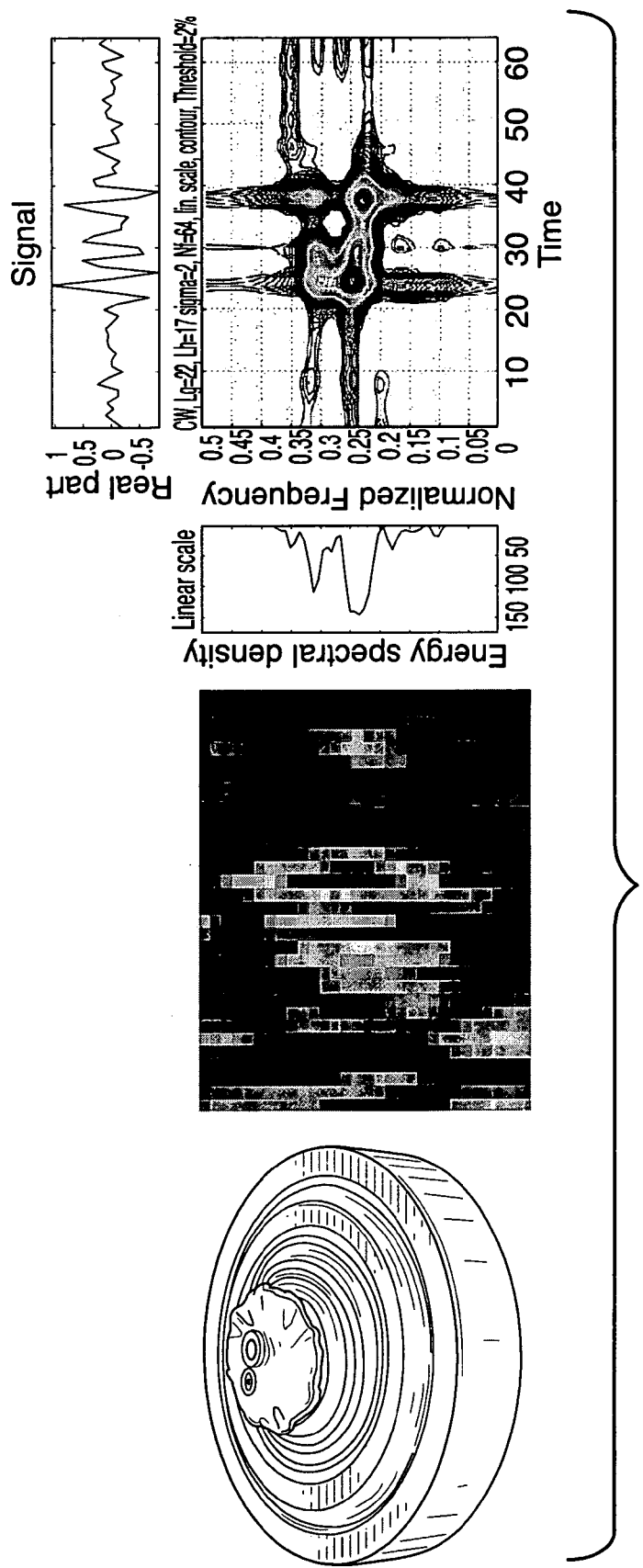
Figure 3B:
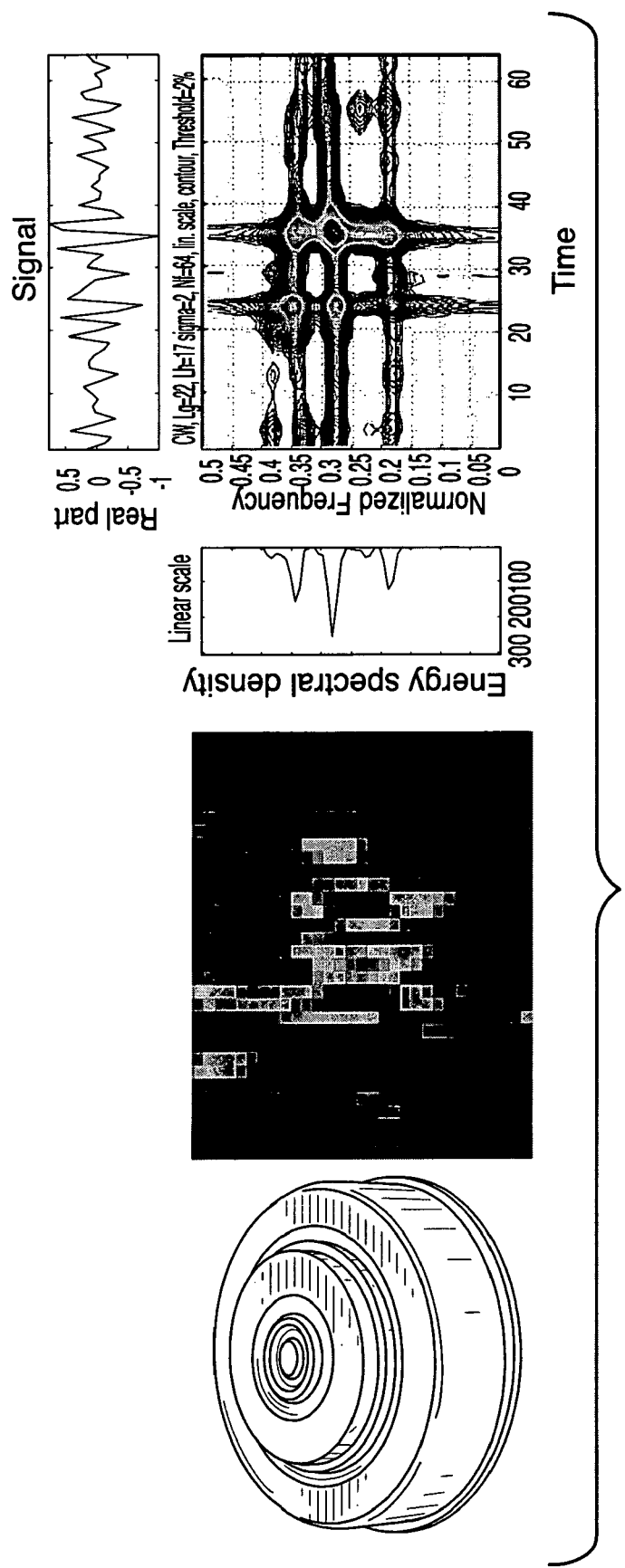
FIG. 3(b) is a scanned mine picture, the corresponding radar image chip and the time-frequency representation for the M2 mine, where both mines were buried at the depth of about 3 inches.

FIG. 3 shows exemplary mine pictures, the corresponding radar image chip (power spectral density) and the time-frequency representation for two types of metal mines buried at a depth of about 3 inches, denoted by M1 and M2 in FIGS. 3(a) and (b), respectively. The image chip has 32×32 pixels. The TF representations can be roughly interpreted as follows: the front and rear edges of the mines can be modeled as two scattering centers, with each edge serving as a discrete event in time. In the time-frequency domain, each scattering center shows up as a vertical line in the image since it occurs at a particular time instant but over all frequencies. The edges thus can be used as salient features for the discrimination of mines from clutter and even possibly for the discrimination among different types of mines. Another feature in the time-frequency domain is the discrete events in frequency, which is due to stronger responses to certain stepped frequencies within the radar frequency band prominent at a particular frequency band and shows up in the time-frequency domain as a horizontal line.

Through the time-frequency analysis, a graphical understanding on how a mine reacts to incident radar signals can be obtained. It has been found that most of the discriminant information between the two classes is time-frequency localized. In a preferred embodiment, the detector extracts time-frequency localized information from the TFR. For example, a wavelet packet transform (WPT) can be used for this purpose. The WPT uses a rich library of redundant bases with arbitrary TF resolution. Using the WPT, the time-frequency localized information from the TFR is extracted in the form of feature set constructed from a wavelet table.

The WPT is a generalization of the discrete wavelet transform (DWT), but provides a much more flexible signal decomposition scheme than DWT. Like DWT, wavelet packet basis functions are also formed by scaling and translating a family of basis functions:

$$w_{j,b,k}(t)=2^{-j/2}w_b(2^{-j}t-k), j,k \in \mathbb{Z} \quad (13)$$

where Z is the set of all integers. However, for WPT, in addition to the scaling parameter j and translation parameter k there is also an oscillation parameter b, with a larger b corresponding to a higher frequency. A father wavelet $\phi(t)$ and a mother wavelet $\phi(t)$ correspond to $w_b$ with b equal to 0 and 1, respectively:

$$w_0(t)=\phi(t), w_1(t)=\psi(t)$$

The rest of the wavelet packet functions are defined as:

$$\omega_b(t) = \sqrt{2} \sum_k f^b(k) \omega_{\lfloor b/2 \rfloor}(2t-k) \quad (14)$$

The filter $f^b(k)$ is either a lowpass or a highpass filter depending on the value of b:

$$f^b(k) = \begin{cases} g(k) & \text{if } b \bmod 4 = 0 \text{ or } 3 \\ h(k) & \text{if } b \bmod 4 = 1 \text{ or } 2 \end{cases} \quad (15)$$

where g(k) and h(k) are the lowpass and highpass quadrature mirror filters (QMF) associated with the mother wavelet functions. Using the wavelet basis functions, the WPT coefficients can then be calculated as the inner product between a signal and the corresponding wavelet basis function:

$$WPT(j,b,k)=\int s(t)w_{j,b,k}(t)dt \quad (16)$$

The wavelet packet decomposition scheme may be better understood with the aid of the two-channel subband coding scheme which is used to implement the DWT. Compared with DWT where at each level only the lower halfband signal is further decomposed, WPT decomposes the higher halfband signal as well as shown in FIG. 4(a). If all of the transform coefficients are retained and stacked together in the order of the level, a wavelet packet table is constructed as shown in FIG. 4(b).

Suppose a signal s(n) of length of L, with L being a multiple of $2^J$ is to be analyzed. The wavelet packet table then has J+1 levels, where J is the maximum possible resolution level. At the resolution level j, the table has L coefficients, divided into $2^j$ coefficient blocks indexed by j and b, and usually named as a node:

$$w_{j,b}=[w_{j,b,1}w_{j,b,2} \ldots w_{j,b,L/2^j}].$$

Figure 5:
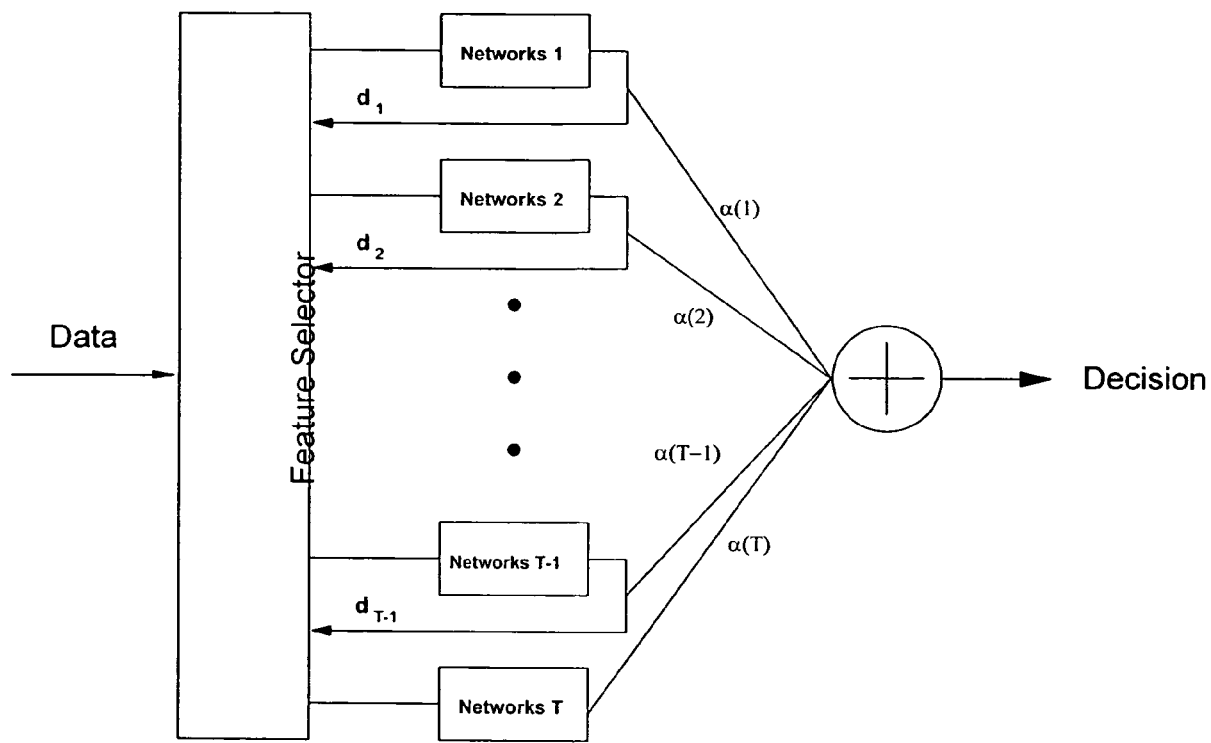
FIG. 5 shows a diagram of the training process of the ensemble neural network classifier using the boosting algorithm AdaBoost.

FIG. 5(b) shows a layout of a wavelet packet table with 3 resolution levels. The level 0 corresponds to the original signal. It can be seen that after WPT, a signal of length L ends up with a maximum of J×L coefficients, indicating WPT is an overcomplete transform. Starting from this table, a particular set of coefficients can be selected to form a complete and orthogonal transformation, one of which is DWT by retaining the coefficients in the nodes of w_{1,1}, w_{2,1}, w_{3,0} and w_{3,1}.

In general, the selection of the bases is usually accompanied by the optimization of a certain cost function, known as the best basis method. However for signal classification, there may be no need for the sought bases to be complete and orthogonal. All that is generally needed is to determine the components that most efficiently encode the discriminant information among signal classes. In this way, the best basis selection process can be directly casted into a feature selection problem.

The full feature set constructed from the wavelet table usually has a high dimensionality relative to the training sample size. Since most of the signal classification systems learn the system parameters in a low dimensional space, reducing the data dimensionality while selecting the most salient features can become important. Two methods, feature selection and feature extraction [See K. Fukunaga, *Statistical Pattern Recognition*, 2nd ed. New York: Academic, 1990], that can be employed to address the above issue. In this application methods of feature selection for reducing the data dimensionality are emphasized.

The problem of feature selection is defined as follows: given a feature set X of size h, let S={P:P⊂X,|P|=l} with l<h (if possible, l<<h and denote by $D(P)=\{(x_n^P, y_n)\}_{n=1}^N \in R^l \times \{\pm 1\}$ a training data set constructed from the feature subset, a feature selection algorithm finds a subset such that a cost function is optimized, i.e., $$\mathcal{P}^* = \arg \max_{\mathcal{P} \in \mathcal{S}} J(\mathcal{D}(\mathcal{P})) \quad (17)$$

Without loss of generality, it is assumed that the larger the cost function, the better the subset. Suppose a suitable cost function has been chosen to evaluate the quality of the candidate feature subset, the feature selection problem is reduced to a searching problem. Although an exhaustive search guarantees reaching the optimal subset, it requires examining $\binom{h}{l}$ possible candidate subsets and consequently it is computationally prohibitive even for moderate values of h and l. An optimal search strategy which avoids an exhaustive search is the Branch and Bound (BB) method [See R. Duda, P. Hart, and D. Stork, *Pattern Classification*. New York: J. Wiley, 2000]. However, it requires the cost function to be monotonic. Though the monotonicity condition is not particularly restrictive, the BB method does not work well for a large scale problem.

Therefore, computationally feasible strategies that avoid an exhaustive search may be used. One example of a computationally feasible strategy is the Sequential Forward Selection (SFS) method. This method starts from an empty set and sequentially adds one feature at a time which when combined with the already selected features maximizes the cost function until a predefined feature number is obtained. The main drawback of SFS is that it is unable to remove a feature once it is retained and becomes obsolete after the inclusion of other features, which is the so-called nesting effect. A more sophisticated search strategy is the Sequential Floating Forward Selection (SFFS) [See P. Pudil and J. Novovicova, "Novel methods for subset selection with respect to problem knowledge," *IEEE Intelligent Systems*, vol. 13, March/April 1998] which attempts to overcome the nesting problem of SFS through a flexible backtracking. The algorithm is summarized as follows:

Pseudocode 1

Initiailization: Full feature set x, $y_0=\{\emptyset\}$, predefined feature number l, k=0

```
while k ≤ l
    x⁺ = argmax_{x∈X-Y_k} J(Y_k + {x})
    Y_{k+1} = Y_k + {x⁺}; k = k + 1
    if k > 2
        x⁻ = argmax_{x∈Y_k} J(Y_k − {x})
        while J(Y_k − {x⁻}) > J(Y_{k−1}) and k > 2
            Y_{k−1} = Y_k − {x⁻}; k = k − 1
            if k > 2, x⁻ = argmax_{x∈Y_k} J(Y_k − {x}), end
        end
    end
end
```

Although SFFS still does not guarantee the optimality of the selected features, it is reported that the flotation SFFS is able to provide a close to optimal solution.

Concerning the cost functions, in this application a cost function based on the linear discriminant analysis (LDA) is used in one embodiment. A data set $D(P)=\{(x_n^P, y_n)\}_{n=1}^N \in R^1 \times \{\pm 1\}$ is assumed. Then the within class scatter matrix $S_w$ and the between class scatter matrix $S_b$ can be defined as follows:

$$S_w = \sum_{\{n: y_n=+1\}} (x_n^P - m_+)(x_n^P - m_+)^T + \sum_{\{n: y_n=-1\}} (x_n^P - m_-)(x_n^P - m_-)^T \quad (18)$$

$$S_b = (m_+ - m_-)(m_+ - m_-)^T \quad (19)$$

To achieve a good class separability, a subset is desired such that the within class scatter is small while the between class scatter is large. One possible scalar measure using the trace of a matrix is:

$$J = tr(S_w^{-1} S_b) \quad (20)$$

Compared with the wrapper method which uses the classification performance of a certain classifier as the selection criterion, using the LDA cost function has a low computational complexity. However, it only exploits the second order statistical information and attempts to select the features with unimodal distributions. Hence, even if the exhaustive search method is used, the so-generated feature set may still be suboptimal. Furthermore, the problem of how to choose the feature number is still open. These problems can be mitigated when the Boosting algorithm is used to select features adaptively.

With the selected features, a neural network (NNW) classifier can be designed. For the reason which will be clear based on descriptions below, the network can be trained by minimizing the cross-entropy error function which is given as follows:

$$E = -\sum_{n=1}^{N} \left( \frac{y_n + 1}{2} \ln z_n + \frac{1 - y_n}{2} \ln(1 - z_n) \right) \quad (21)$$

where $y_n \in \{\pm 1\}$ and $z_n \in [0,1]$ are the target value and the output of the network, respectively, corresponding to the input $x_n$. With the output activation function being chosen to be the logistic function:

$$g(a) = \frac{1}{1 + \exp(-a)} \quad (22)$$

it can be shown that the output $z_n$ of the network is the estimate of the posterior probability of $x_n$ belonging to the mine class, i.e., $z_n = \hat{P}(y=+1|x_n)$.

Although a NNW is capable of providing a nonlinear mapping for the training data, in the training stage it can become stuck in local minima. Thus, reaching the global minima is not guaranteed. Moreover, the problem of finding the optimum NNW structure, i.e., specifying the numbers of hidden units and hidden layers, is generally not trivial. It is usually a process of trial-and-error and a large amount of data may be needed to support this process. Since collecting mine samples can be expensive, a practical strategy described below uses a relatively simple classifier, particularly a NNW classifier with a simple structure, and then uses a boosting method to transform the weak learner into a strong learner.

Boosting is a general method of producing a very accurate prediction rule by combining rough and moderately inaccurate "rules of thumb". The basic idea of boosting is to linearly combine simple hypotheses, called base learners or weak learners, to form an ensemble so that the performance of each simple ensemble member is boosted. Given a classifier class H from which the base learners can be recalled, an ensemble hypothesis is formed:

$$F(x) = \sum_{t=1}^{T} \alpha_t h_t(x) \quad (23)$$

such that a cost function is optimized, where $h_t$ is an element of H and both $\alpha_t$ and $h_t$ are learned in the boosting procedure.

In the past several years, several ensemble methods have been developed. Among them, adaptive boosting (AdaBoost) is the most popular one. The basic theoretical property of AdaBoost is its ability to reduce the training error. The training error decreases exponentially with respect to the number of combined classifiers. Moreover, AdaBoost can also reduce the generalization error and in many cases, the generalization error continues to decrease even after training error becomes zero.

The original AdaBoost [Yoav Freund and Robert E. Schapire, "A decision-theoretic generalization of on-line learning and an application to boosting", European Conference on Computational Learning Theory, 1995] uses the $\{\pm 1\}$ valued classification functions, i.e., $h_t: x \to \{\pm 1\}$, as the base learners. This work has been extended it to a more general version, which used the real-valued functions as the base learners, that is, $h_t: x \to [-1, +1]$ with $sgn(h_t(x))$ being the class label and $|h_t(x)|$ the classification confidence. The pseudocode of AdaBoost using soft decisions is presented as follows:

---

Pseudocode 2

Initialization: $\mathcal{D} = \{(x_n, y_n)\}_{n=1}^{N} \in \mathbb{R}^1 \times \{\pm 1\}$, Maximum iteration number T, $d_1(n) = 1/N$
for $t = 1 : T$
 1. Training weak learner with respect to distribution $d_t$ and get hypothesis $h_t(x) : x \to [-1,1]$.

2. Calculate the weighted margin: $r_t = \sum_{n=1}^{N} d_t(n) y_n h_t(x_n)$

3. Set $\alpha_t = \frac{1}{2} \ln\left(\frac{1+r_t}{1-r_t}\right)$

4. Update weights:

$d_{t+1}(n) = d_t(n) \exp(-\alpha_t y_n h_t(x_n))/z_t$ where $z_t$ is the normalization constant such that $\sum_{n=1}^{N} d_{t+1}(n) = 1$.

end
Output:

$$F(x) = \sum_{i=1}^{T} \alpha_t h_t(x)$$

---

In an embodiment of the application, a neural network classifier is used as the weak learner to estimate the posterior probability of the training samples and thereby the weighted margin is calculated. One problem associated with the neural network is the possibility of the network being trapped by local minima. Without using the boosting method, one possible method is to re-train the network. Here, however, as long as the weighted margin $\gamma_t > 0$, the cost function always directs downhill.

An intuitive idea in the AdaBoost is that the examples which are misclassified get more weights in the next iterations and hence the subsequent classifiers focus more and more on those harder cases, for instance, the samples near the decision boundary. In other words, the subsequent classifiers attempt to modify the decision boundary locally in the data space. In the original AdaBoost, the algorithm trains an ensemble of classifiers based on the training data with different distributions but with the same features. In a preferred embodiment of the invention, the data dimensionality is reduced through feature selection in order to avoid the problems of high dimensionality. However, the features so-produced are aimed at optimizing a certain cost function based on the entire training data set other than being in favor of part of the data and thus may not be able to provide sufficient discriminant information for these harder samples.

Figure 6:
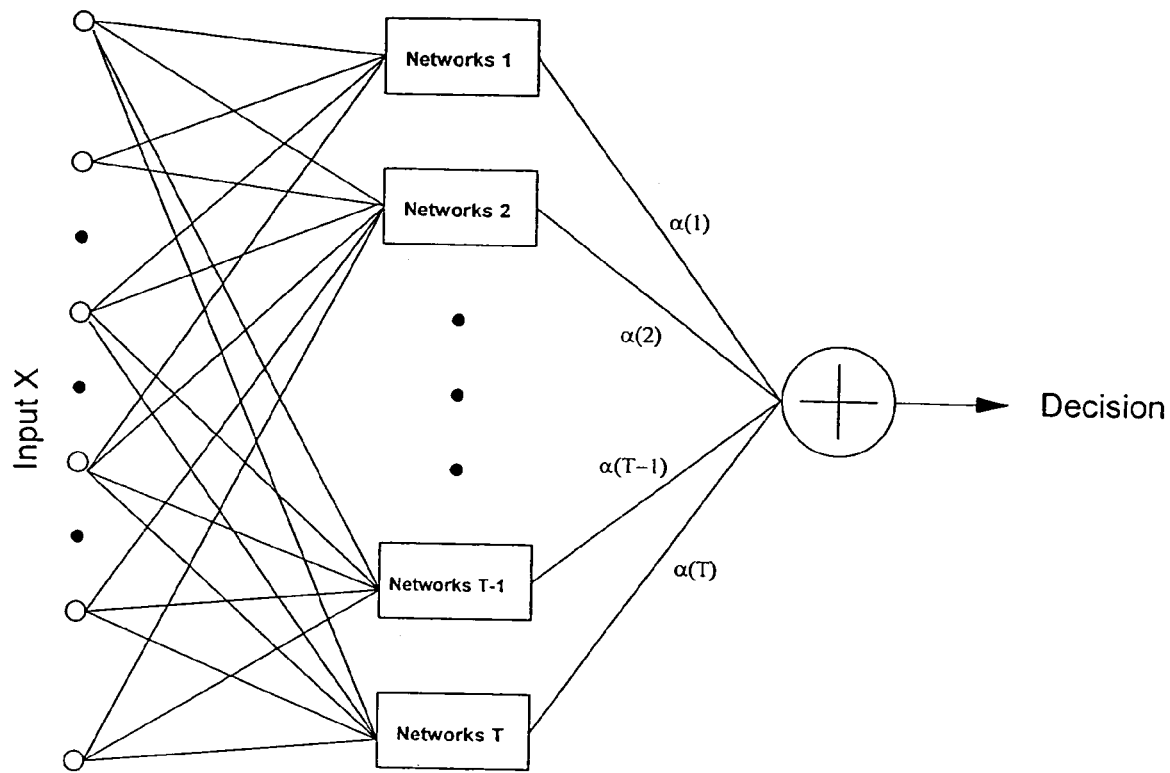
FIG. 6 shows a resulting ensemble neural network classifier. Due to the feature selection process, most of the connecting weights between the input vectors and each neural network are set to zero.

This issue can be largely solved by re-extracting features adaptively based on the misclassified samples before entering the next iteration. This process is depicted in FIG. 6 which shows a training process of the ensemble neural network classifier using the boosting routine AdaBoost. With the iterations, it is expected that the ensemble classifier will overfit the training data eventually. However, in the experiments performed, due to the good overfitting resistance of AdaBoost, the ensemble classifier does not show an apparent overfitting phenomenon even after 200 iterations. Shown in FIG. 6 is the resulting ensemble neural network classifier. Note that due to the feature selection process most of the connecting weights between the input vectors and each neural network are set to zero. It can thus be considered as an ensemble of experts making the decisions based on the different sets of features.

EXAMPLES

The present invention is further illustrated by the following specific Examples, which should not be construed as limiting the scope or content of the invention in any way.

Mine patterns taken from surface mines using the invention are first presented in time-frequency form. It is reported that surface mines have a salient double-peak signature in the spatial domain, which can be interpreted as the signals returned from the front and rear edges of a mine. It becomes even more evident in the time-frequency domain. FIGS. 7(a)–7(d) show several time-frequency representations for a surface placed metal mine (TM62M), a plastic mine (TM62P3), a plastic mine (VS2.2) and a stake (fiducial), respectively. The front and rear edges can be modeled as scattering centers, with each edge serving as a discrete event in time. In the time-frequency domain, it shows up as a vertical line in the image since it occurs at a particular time instance but over all frequencies. The edges can be used as a salient feature for the discrimination of mines from clutter and even possibly for the discrimination among different types of mines. To illustrate this, the distances between the edges are measured and compared with the diameters of the mines. These quantities are quite close for the mines of TM62M and TM62P3. The exception for the VS2.2 mine is self-explanatory due to the smaller diameter of its top.

To demonstrate the performance of an exemplary classifier according to the invention, experimental results based on measured FLGPR obtained time-frequency data is presented. The data collection included 133 mine chips and 3962 clutter chips, in which 113 mines and 3462 clutter are randomly selected as the training data and the rest as the testing data. Note that the training data for the two classes are highly unbalanced. A five down-range profile signals through the center of each mine chip were taken to augment the mine data set, which leads to 565 and 100 samples, respectively, in the mine training set and testing set.

A Daublet 10 wavelet filter was used to decompose the TFR signals into the WPT coefficients and then SFFS with LDA cost function found 10 features from the WPT table. With the selected features, a multilayer neural network classifier was designed. The structure of the network used was quite simple: The network had 10 input units, 5 hidden units and 1 output units. The sigmoid function and the logistic function were used in the hidden layer and output layer, respectively, as the activation functions.

The network was then trained to minimize the cross-entropy error function. In term of the network outputs, a weighted margin was calculated and the training data distribution was updated. Before entering the next iteration, a new set of features was re-extracted based on the training data with the updated distribution. The above procedure was iterated until the maximum iteration number is reached. The final decision was calculated as the weighted combination of the decisions of the base learners. A total of 10 experiments were conducted. The 10 training and testing results obtained were averaged and are plotted in FIGS. 8(a) and (b), respectively. As expected, the training errors are continuously reduced with the increase of the iteration number and reach zero when about 50 classifiers are included in the ensemble classifier. In general, it may not be desirable to reduce the empirical error zero due to the overfitting concerns.

Figure 8:
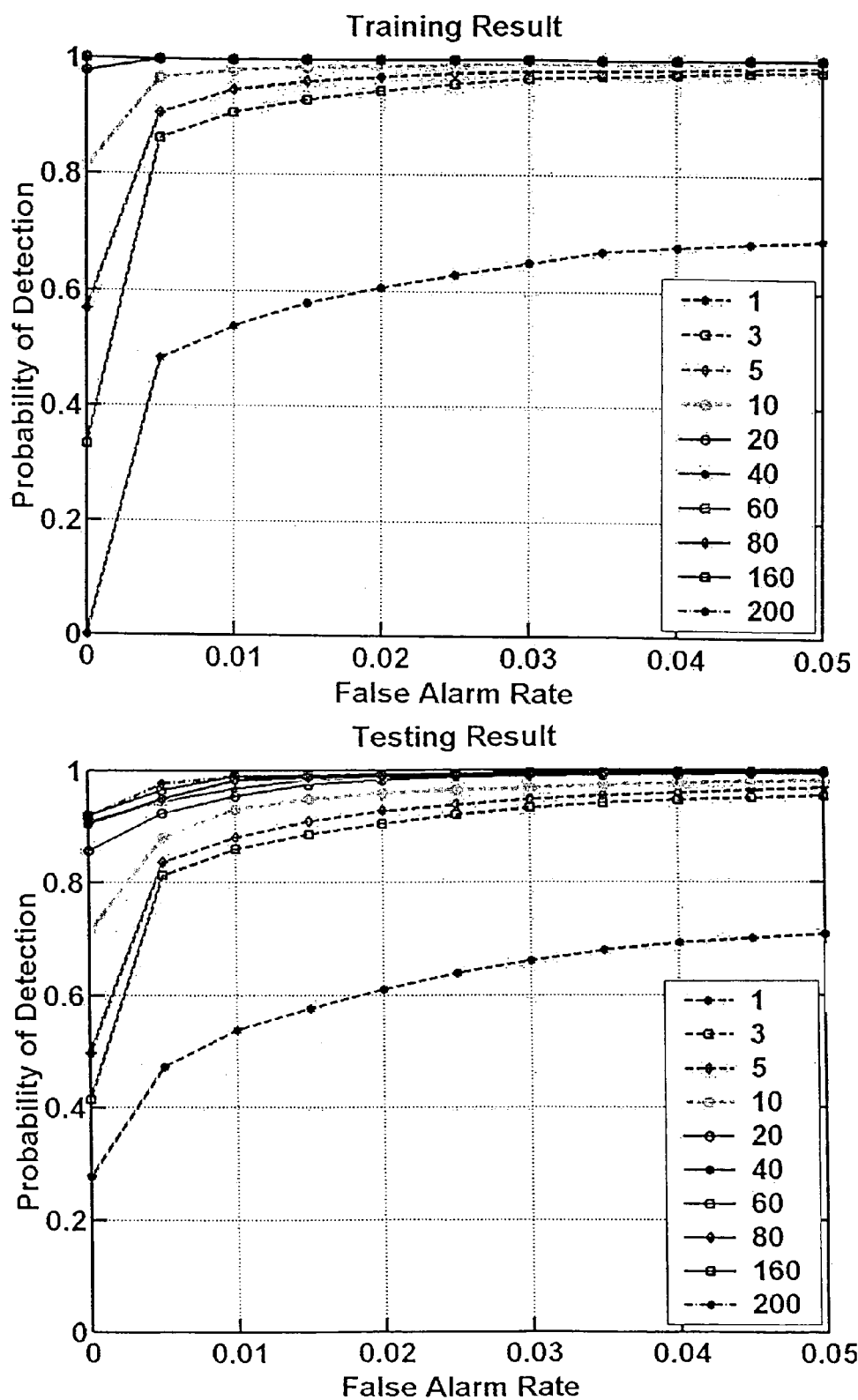
FIG. 8 shows training and testing results for the ensemble classifier with the feature selection being integrated into each iteration. The numbers in the legend are the iteration numbers. The first iteration corresponds to the classifier without AdaBoost.

However, as shown in FIG. 8, the ensemble classifier presents a very impressive generalization capability. With the inclusion of more classifiers, the receiver operation characteristic (ROC) curve of the testing results are continuously pushed toward the upperleft corner and is saturated when the number of ensemble members reaches 80. Interestingly, the ensemble classifier does not show an apparent overfitting phenomena even when 200 classifiers are combined.

Figure 10:
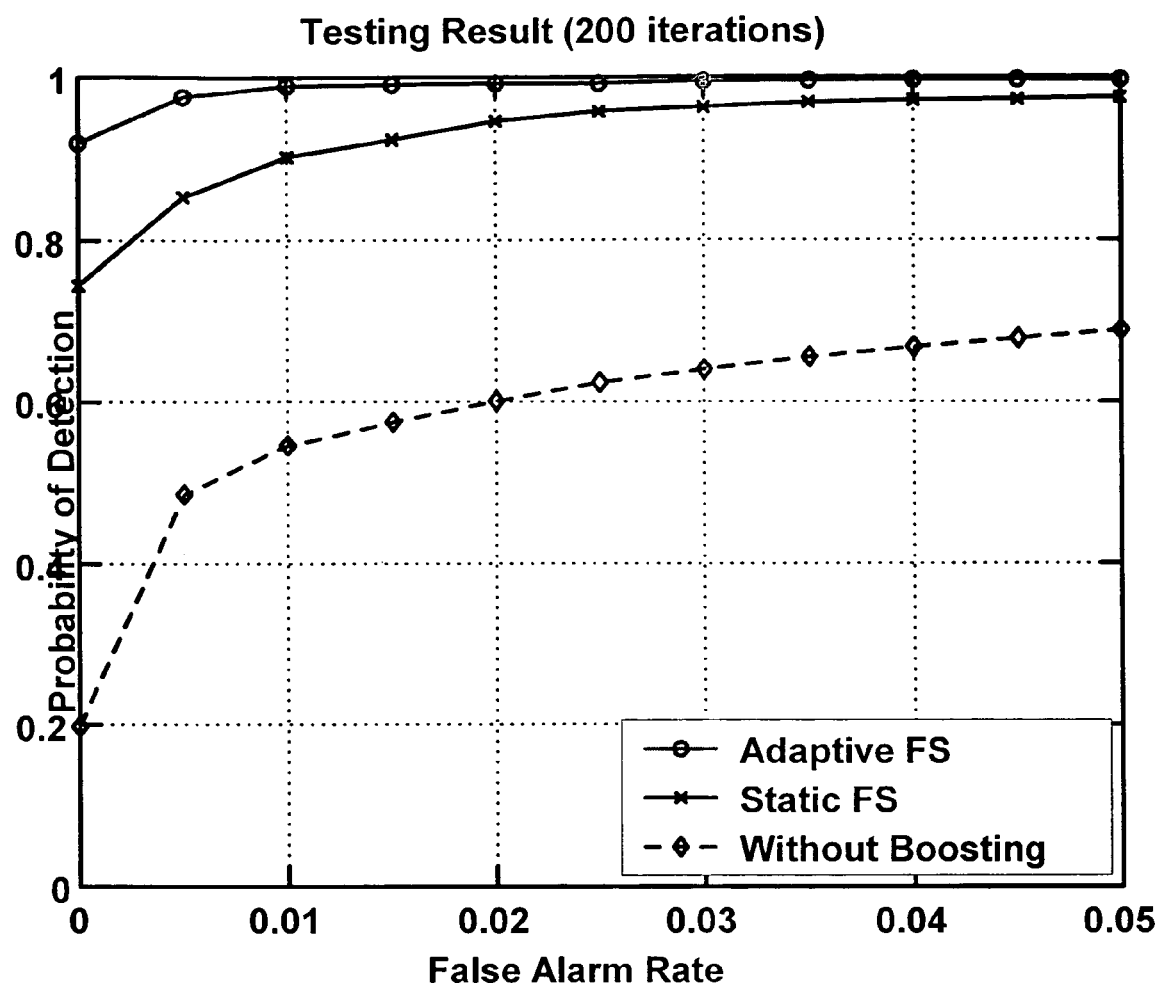
FIG. 10 shows the ensemble classifier with adaptive feature selection improving the testing performance significantly over the classifier without adaptive feature selection.

For comparison, the results for the ensemble classifier which has no feature selection module integrated in each iteration are also presented and shown in FIG. 9(a) and (b). That is, during the boosting procedure, features are not re-extracted adaptively for the misclassified training samples. Again, the training errors are reduced to zero with the increase of iteration number and the testing results show that the ensemble classifier has a good generalization capability, which however, is much worse than that of the ensemble classier with adaptive feature selection as shown in FIG. 10. The data indicates that the AdaBoost algorithm with the feature selection being integrated effectively extracts the discriminant information and at the same time controls the side effect of overfitting.

The methodology of the present invention can be realized in hardware, software, or a combination of hardware and software. An implementation of the heuristic routing method of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A forwarding looking ground penetrating mine detection apparatus, comprising:
    a movable vehicle;
    a radiation source comprising dual transmitting antennas mounted on said movable vehicle for irradiating a sample of ground suspected of containing at least one mine with a plurality of frequency swept ground penetrating radar signals, each of said radar signals having a discrete frequency, the discrete frequencies being evenly spaced over a predetermined frequency range; and
    a detector comprising a plurality of evenly spaced-apart receiving antennas mounted on said movable vehicle for receiving target signals backscattered from said ground responsive to said radar signal, said detector including a time-frequency analyzer, said time-frequency analyzer transforming said target signals into a time-frequency image representation (TFR);
    wherein said transmitting antennas operate sequentially in irradiating the sample, and wherein said receiving antennas operate simultaneously in receiving the target signals.

2. The apparatus of claim 1, wherein said detector further comprises a wavelet packet transformer (WPT), said WPT extracting time-frequency localized information from said TFR.

3. The apparatus of claim 2, wherein said time-frequency localized information comprises a feature set constructed from a wavelet table provided by said WPT, said feature set having a first data dimensionality, further comprising a data dimensionality reducer, said dimensionality reducer selecting features to form a feature subset from said feature set, said feature subset having a reduced dimensionality as compared to said first dimensionality.

4. The apparatus of claim 3, wherein said dimensionality reducer implements a sequential forward selector (SFS) with a cost function to compile said feature subset.

5. The apparatus of claim 4, wherein said cost function comprises a linear discriminant analysis (LDA) cost function and said SFS comprises sequential floating forward selector.

6. The apparatus of claim 5, wherein said data dimensionality reducer selects said feature subset based on reference to a training data set.

7. The apparatus of claim 4, further comprising a multilayer neural network classifier based on said feature subset.

8. The apparatus of claim 7, wherein said neural network is a trained network.

9. The apparatus of claim 8, wherein said training comprises minimizing a cross entropy function.

10. The apparatus of claim 7, wherein said neural network implements a boosting based adaptive feature selector.

11. The apparatus of claim 1, wherein said time-frequency analyzer implements a Choi-Williams Distribution (CWD).

12. A mine detection method, comprising the steps of:
    irradiating a sample of ground suspected of containing at least one mine with a plurality of frequency swept ground penetrating radar signals using dual transmitting antennas mounted on a movable vehicle, said transmitting antennas being operated sequentially to irradiate the sample with frequency swept ground penetrating radar signals, each of said radar signals having one of a plurality of discrete frequencies evenly spaced over a predetermined frequency range;
    receiving at a plurality of evenly spaced-apart receiving antennas mounted on said movable vehicle a signal backscattered from a ground penetrating swept radar radiated ground sample;
    generating a time-frequency representation based on said backscattered signal, and
    analyzing said time-frequency representation to indicate whether a mine is in said ground.

13. The method of claim 12, further comprising the step of wavelet packet transforming to extract time-frequency localized information from said TFR, said time-frequency localized information comprising a feature set constructed from a wavelet table provided by said wavelet packet transforming.

14. The method of claim 12, further comprising the step of data dimensionality reducing said feature set to provide a reduced dimensionality feature subset.

15. The method of claim 14, wherein said dimensionality reducing comprises a sequential forward selector (SFS) with a cost function.

16. The method claim 15, wherein said cost function comprises a linear discriminant analysis (LDA) cost function and said SFS comprises sequential floating forward selector.

17. The method of claim 16, further comprising extracting time-frequency localized information from said TFR based on reference to a training data set.

18. The method of claim 14, further comprising the step of configuring a multilayer neural network classifier based on said feature subset.

19. The method of claim 18, further comprising the step of training said neural network to a surrounding environment adjacent to said ground.

20. The method of claim 19, wherein said neural network implements a boosting based adaptive feature selector.

21. The apparatus of claim 1, wherein said radar signals operate over 1024 discrete frequencies and wherein the discrete frequencies are evenly spaced at 2.5 MHz intervals over a frequency range from 442.5 MHz to 3 GHz.

22. The apparatus of claim 21, wherein the apparatus irradiates a sample and receives backscattered signals at 2 meter intervals as the moveable vehicle advances.

23. The apparatus of claim 22, further comprising a global positioning system to measure the location of the apparatus at each 2 meter interval.

* * * * *